March 24, 1959 R. B. KENYON 2,878,521
METHOD OF MANUFACTURING SHEETING MATERIAL
Filed Nov. 3, 1953 4 Sheets-Sheet 1

Roger B. Kenyon
INVENTOR.

BY
ATTORNEYS

March 24, 1959 R. B. KENYON 2,878,521
METHOD OF MANUFACTURING SHEETING MATERIAL
Filed Nov. 3, 1953 4 Sheets-Sheet 2

Roger B. Kenyon
INVENTOR.
BY
ATTORNEYS

March 24, 1959   R. B. KENYON   2,878,521
METHOD OF MANUFACTURING SHEETING MATERIAL
Filed Nov. 3, 1953   4 Sheets-Sheet 3
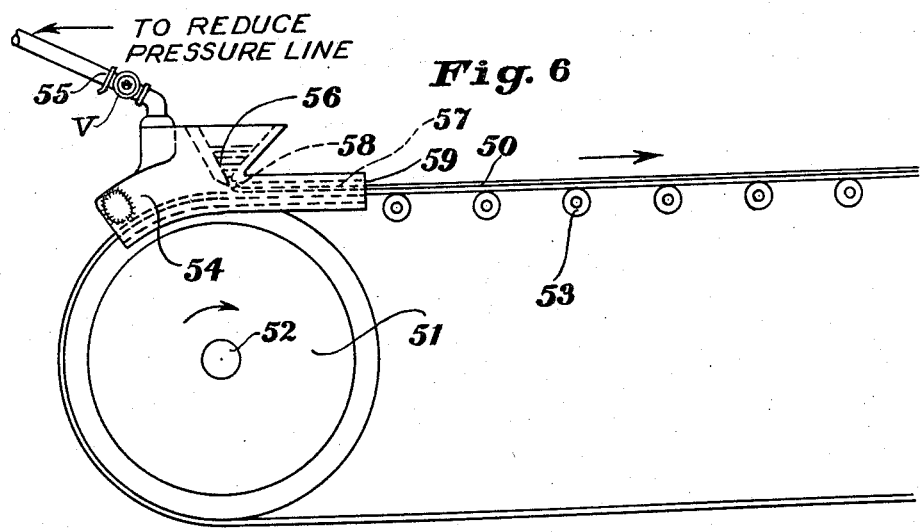
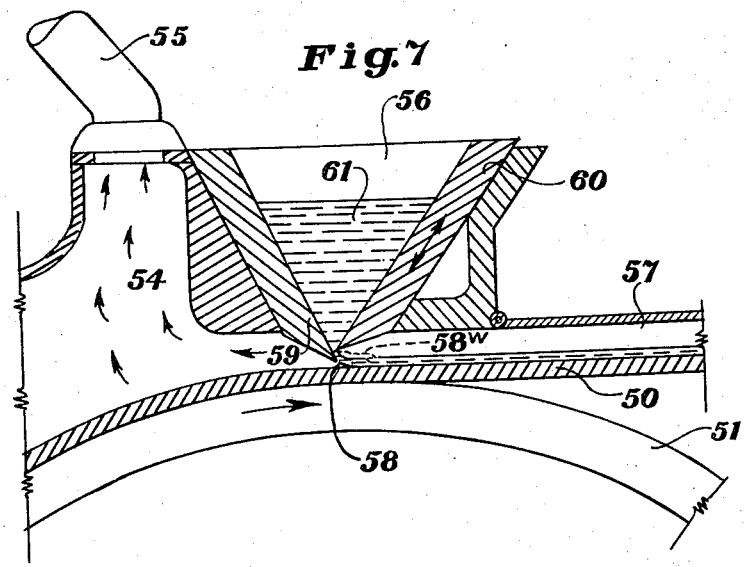
Roger B. Kenyon
INVENTOR.
BY
ATTORNEYS March 24, 1959  R. B. KENYON  2,878,521
METHOD OF MANUFACTURING SHEETING MATERIAL
Filed Nov. 3, 1953  4 Sheets-Sheet 4

Roger B. Kenyon
INVENTOR.
BY

United States Patent Office 2,878,521
Patented Mar. 24, 1959

2,878,521

METHOD OF MANUFACTURING SHEETING MATERIAL

Roger B. Kenyon, Rochester, N.Y., assignor to Eastman Kodak Company, Rochester, N.Y., a corporation of New Jersey Application November 3, 1953, Serial No. 390,039

3 Claims. (Cl. 18—57)

This invention relates to a method of manufacturing strip material and particularly to a method of manufacturing such sheeting from a cellulose ester solution such as cellulose acetate, cellulose triacetate, cellulose acetate butyrate, cellulose acetate propionate, and the like.

It has been customary to manufacture strip materials suitable for film base, wrapping materials, sheets and the like by flowing a cellulosic solution on a support while moving the support through a path during which movement solvents are removed. These methods have generally been satisfactory as to quality of sheeting when made relatively slowly but since the apparatus is usually costly and in known processes slow, it is very desirable to produce such sheeting at higher speeds. With known methods of sheet forming to produce sheeting materials, there has been in the past considerable difficulty with "cross-lines" of corrugations or imperfections extending transversely of the sheet. This has been particularly noticeable in some of the thinner sheetings such as .001 inch to .003 inch, for instance. Vibrations of the stream of cellulosic solutions may be the cause of these lines which could generally be eliminated by slowing up the operation of the machine. This is undesirable.

In order to eliminate these and other difficulties, I have provided a method by which the speed of the apparatus may be materially increased, say, for instance, up to 200 or more percent in some cases and by which method the "cross-lines" may be greatly reduced or entirely eliminated even at the increased speeds. It is believed that it will be quite possible to increase the speed of certain types of sheeting up to even 500% or more where conditions are suitable, although the upper limits of speed are also more or less controlled by the speed of removal of solvents in the sheet so that it may become self-supporting. My improvements have been accomplished by flowing the usual thin stream or ribbon of cellulosic composition from a hopper device upon a movable support such as a casting wheel and maintaining the ribbon of flowing composition between the hopper and the casting surface or support in a film forming position by applying differential pressures to the two sides of the ribbon. A reduced pressure is applied to that side of the ribbon of coating composition which will lie against the casting surface or support and a somewhat higher pressure is maintained on the opposite side of the ribbon which is spaced from the casting surface. This pressure differential need not be great, as, for instance, a pressure differential of from .7 inch to 8.00 inches of water. It is usually desirable and is simpler to provide atmospheric pressure on one side of the ribbon and a comparatively small degree of vacuum to the other side of the ribbon. It is, of course, possible to provide a difference in pressures on the two sides of the ribbon, which may be both subatmospheric or both superatmospheric or which may be atmospheric and above atmospheric, although in each case it would require somewhat more equipment to carry out the process.

My invention is directed to an improved method of depositing cellulosic solutions on casting surfaces to reduce or eliminate previous defects and to obtain considerably higher speeds than have heretofore been thought possible. A further object is to reduce or eliminate "cross-lines" in sheeting and particularly in thin sheeting where such lines are most noticeable. A still further object is to provide a method of making cellulosic sheeting in which the sheeting is uniformly accurate in thickness. Other objects will appear from the following specification, the novel features being particularly pointed out in the claims at the end thereof.

This application is a continuation-in-part of my application Serial No. 243,213, filed August 23, 1951, for "Method of Manufacturing Sheet Material" now abandoned. In my copending application Serial No. 243,214, filed August 23, 1951, for "Apparatus for Manufacturing Sheeting," now Patent No. 2,712,745, I have shown apparatus suitable for carrying out my improved method. The objects of the present invention may be carried out by the use of apparatus shown in the accompanying drawings wherein like reference characters denote like parts throughout.

Fig. 6 is a side elevation of a second embodiment of my invention schematically showing a belt type of casting surface.

Fig. 7 is an enlarged fragmentary view taken through the hopper of a machine shown in Fig. 6 and omitting certain parts for clearness.

My improved method includes providing differential pressures on the two sides of a flowing ribbon or stream of cellulosic film-forming composition flowing from a hopper device to a casting surface such as a wheel or belt. The reduced pressure which may be .7 inch to 8.00 inches of water, for instance, should be applied to that side of the ribbon toward which the casting surface approaches the hopper device or to that side of the ribbon which will be in contact with the casting surface. The higher pressure should be applied to that side of the ribbon which will lie spaced from the casting surface as the sheet material moves with the moving casting surface away from the hopper. As above pointed out, the difference in pressure is usually more conveniently carried out by utilizing an atmospheric pressure on the high pressure side and a partial vacuum on the low pressure side. If desired, two degrees of subatmospheric pressure may be employed one lower than the other or atmospheric and superatmospheric pressures or superatmospheric and a higher degree of superatmospheric pressure may be employed.

The difference in pressures tend to prevent the ribbon from fluttering and moving with the casting surface thus overcoming transverse lines probably due to irregularities of the coating ribbon and probably due to the coating ribbon moving from its preferred coating position. In addition, higher speeds of the casting surfaces are permitted. Under certain conditions cellulosic compositions may be cast at up to 200% or more faster when the differential pressure on the two sides of the ribbon of coating composition is properly employed. While speeds of 200% faster than can now be obtained without the use of differential pressures have been obtained, these are by no means the limits of possible speed increases since there are many other factors which have to be considered. One of the most important of these is removing the solvents with sufficient rapidity to obtain a self-supporting sheet with the present apparatus. Since most of these casting machines are quite large and costly and are not generally designed for higher speeds, it is difficult to try out the full possibilities of speed increases. Tests and calculations indicate speed increases may well go as high as 500%. Speed is also more or less controlled by the temperatures, viscosities, the thicknesses of the film and many other variables.

"Slugging" is one of the difficulties encountered in making sheeting. This term is sometimes applied to solidified or partly solidified drops or beads of film-forming compositions which usually cling to the hopper blade and particularly to the ends thereof. Where "slugging" occurs, irregularities in the sheet result. To eliminate these difficulties solvent-laden vapors have been passed about those portions of the hopper blade which are usually affected. The recirculation of such vapors is not broadly new but my improved method contemplates a new way of carrying this out.

Figure 1:
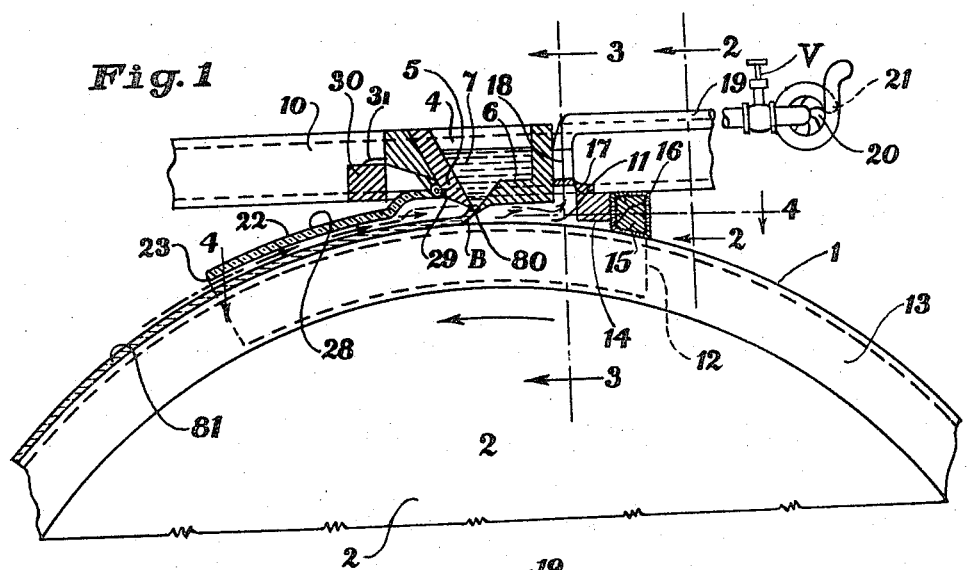
Fig. 1 is a schematic part-side elevation and part section through an improved apparatus for depositing a cellulosic composition on a moving casting wheel and which may be used in carrying out my invention.
Figure 2:
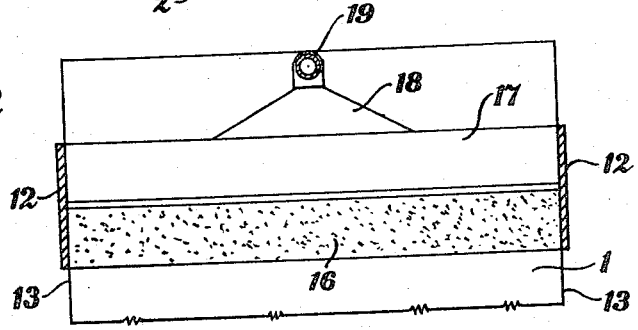
Fig. 2 is a fragmentary end elevation of the apparatus shown in Fig. 1 taken on line 2—2 of Fig. 1.
Figure 3:
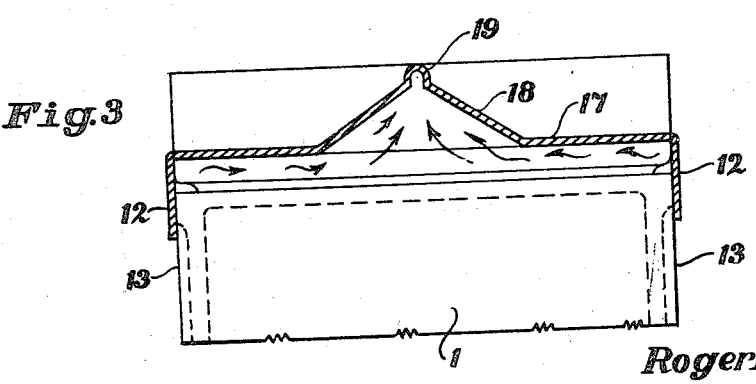
Fig. 3 is a sectional view taken on line 3—3 of Fig. 1.

In the drawings, Fig. 1 shows a schematic view of a typical apparatus suitable for my improved method with many parts omitted to better illustrate the invention. The casting surface 1 is here shown as the periphery of a wheel 2 turning on trunnions 3. The casting surface is preferably of the finish desired for the sheeting—usually a smooth highly polished chromium surface—although any suitable finish may be employed.

Figure 5:
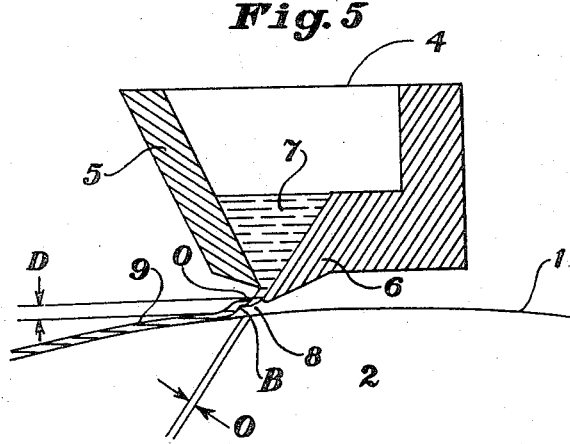
Fig. 5 is an enlarged fragmentary section through a typical coating hopper, this view showing the position of a ribbon of cellulosic composition flowing onto a casting surface without the benefit of my improved method.

A hopper 4, Fig. 5, may be of a known type including blades 5 and 6 spaced a distance D, such as .06" from the casting surface 1 and spaced apart a distance 0, such as .025"–.030", to permit the desired flow of cellulosic composition. These figures are purely by way of example and may vary widely in accordance with the sheeting required, the temperatures, the viscosities and other factors. This hopper contains a constant supply 7 of cellulosic coating material, or other suitable composition which may flow from between blades 5 and 6 in a thin stream or ribbon 8 onto the casting surface 1 forming a continuous sheet 9 thereon.

As shown in Fig. 1, the hopper may be supported by a frame 10. There is a reduced pressure housing 11 made up of side plates 12 closely fitting the smooth peripheries 13 of the wheel 2 and having a substantially air-tight fit therewith, these side plates 12 are connected to a cross bar 14 which may be also supported by the frame 10. A second rail 15, in this instance completely covered with plush 16, rides against the casting surface 1, thus making a substantially air-tight connection with the wheel and bar 14. A top wall consists of a plate 17 having a cone-shaped top 18 from which a pipe 19 leads to (in this embodiment) the intake 20 of a fan 21. The small amount of reduced pressure required can readily be obtained by this or other means.

The side plates 12 may continue past the hopper 4 and may form the side walls of a chamber 22 spaced a short distance as, for instance, .25" from the casting surface. The end 23 is open to the ambient atmosphere.

Figure 4:
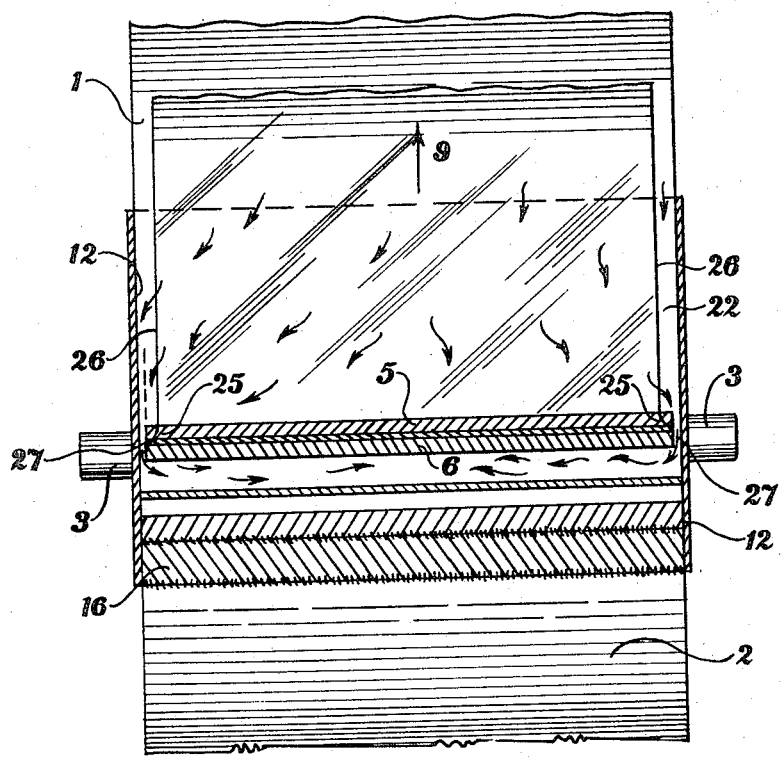
Fig. 4 is a section through the apparatus shown in Fig. 1 and taken on line 4—4 thereof.

It will be noted from Fig. 4 that as the cellulosic film-forming material flows from hopper blades 5 and 6 it may be drawn out in a curve 25 which terminated in parallel lateral edges 26 of the sheet 9. There is thus left a space 27 between the edges of the ribbon 8 and the side walls of the hopper through which solvent vapors which collect in chamber 22 may be drawn by the reduced pressure in chamber 11. Because these spaces 27 are small as, for instance .25" wide and perhaps from .060" to 0.75" high, the pressure in chamber 22 remains substantially atmospheric and no difficulty occurs in maintaining the reduced pressure of the desired amount in chamber 11. Enough solvent vapors pass the ends of blades 5 and 6 to prevent slugging.

Chamber 22 may include a top wall 28 hinged at 29 to the hopper 4. The wall 28 is preferably of transparent plastic or glass to facilitate viewing the deposited sheet. Windows may also be provided to view the ribbon of coating composition if desired. A support 30 may include a flanged connection 31 with the hopper 4. The flowing stream or ribbon 80, Fig. 1, is held in a depositing position more nearly radially of the wheel where the reduced pressure is used than without this pressure differential as shown in Fig. 5. This is desirable as it shortens the length of the ribbon and tends to hold it in a desirable depositing position free from fluctuations. From the ribbon 80, the solution flows into a smooth sheet 81 on the casting wheel 1. After solvent evaporates and the sheet sets, it may be removed from the wheel in a known manner.

Figure 8:
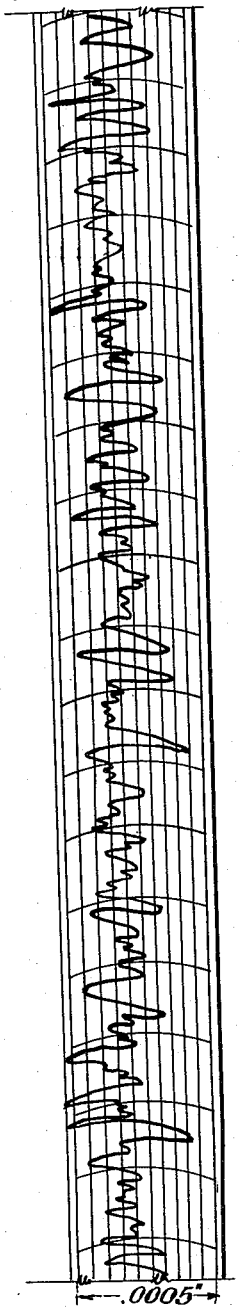
Fig. 8 shows a graph or chart made from sheeting formed under the old method in which the gauge of the material varies to an unacceptable extent.
Figure 9:
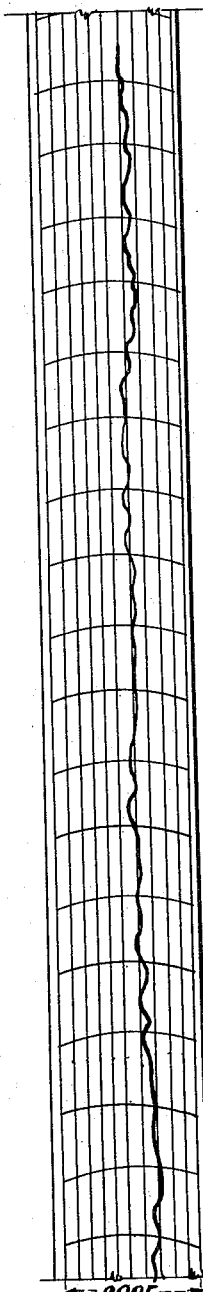
Fig. 9 is a similar view of a graph made from a coating made on the same machine but utilizing my improved method with a partial vacuum on one side of the ribbon coating composition and indicating an acceptable sheet.

Figs. 8 and 9 are simplified copies of graphs made from two runs on the same machine making .00325" sheeting. The same compositions, temperatures, speeds and viscosities are employed, the sole difference being no differential pressures in Fig. 8 and in Fig. 9 a vacuum equal to 2.0" of water is employed on one side of the ribbon. These graphs illustrate thickness variations. Fig. 8 shows these variations to be .0004", the sheeting being considered unacceptable whereas Fig. 9 shows variations of .0001", the sheeting being acceptable.

It is, of course, possible to have other continuously moving casting surfaces such as the belt 50 shown in Fig. 6. Such a belt may be supported on a pair of spaced wheels 51, only one of which is shown. These wheels may have trunnions 52. Idler rollers 53 may support the upper run of the belt to prevent sagging. In this coating apparatus, a substantially air-tight reduced pressure casing 54 is provided on the incoming side of the belt 50. A pipe 55 leads to a reduced pressure source. A hopper 56 supplies a cellulosic film-forming composition to the casting surface 50, and a chamber 57 surrounds belt 50 and extends up to the wheel. Thus, the apparatus may resemble that of Fig. 1 modified to fit a belt type of machine rather than a wheel type. Here, again, reduced pressure in chamber 54 tends to hold a flowing stream or ribbon 58 steady and in an accurate depositing position. The chamber 57 holds some of the evaporating solvents so that small amounts thereof may be drawn through the small openings between the edges of the ribbon and the casing as described relative to Fig. 4.

Hopper 56, Fig. 7, may include blades 59 and 60 at least one of which, here shown as 60, being adjustable to and from the casting surface of belt 50. This surface is preferably polished smooth and may be chromium-plate. The sheet-forming composition 61 preferably has a constant head and the ribbon 58 is held in a substantially steady casting position by the reduced pressure in chamber 54. Without this reduced pressure, the ribbon may be drawn out into an elongated wavy ribbon as indicated in broken lines in Fig. 5. This apparatus, by applying a reduced pressure to the ribbon, not only shortens the ribbon, but steadies it, and the differential pressures in chambers 54 and 57 maintain the ribbon in a preferable casting position.

As pointed out above, it is generally most convenient to use atmospheric pressure on one side of the ribbon of coating composition and a partial vacuum on the other side of the ribbon but my method will work equally well where two different degrees of vacuum are employed and where two different pressures such as superatmospheric pressure or room pressure are employed or where two different superatmospheric pressures are used. Obviously my improvement consists in the differential action of the different pressures on the two sides of the ribbon of coating composition, which pressures are selected to maintain the ribbon of coating composition in the desired coating position and as free from movement or fluttering as can be obtained. It is a comparatively simple matter to introduce a pressure differential and vary this differential while adjusting the pressure ratio on one side of the ribbon of flowing composition relative to the pressure on the other side as by adjusting a valve V controlling the pressure on one side. By watching the depositing ribbon or deposited sheet move and reach an equilibrium and appear substantially motionless when the proper pressure differential is reached, one can select the necessary pressure differential for the job.

It is generally preferable to gradually increase the speed of the sheet receiving or casting surface 1 in a known manner, while depositing sheet forming composition thereon and then watch the sheet or ribbon of coating composition while gradually changing the pressure differential by valve V. Where the deposited sheeting and/or the ribbon of coating composition reach an equilibrium, the sheeting appears smooth and the casting surface is up to the desired speed, usually no further adjustments are required. With some sheeting materials more preliminary adjustments are required than with others.

It is interesting to note that the pressure differentials are not critical and can be varied to quite a considerable extent while maintaining the flowing ribbon of coating composition in a depositing position. This is illustrated in a chart referred to later. This chart illustrates the results of coating with and without differential pressures with a series of different coating solutions which are typical illustrations of the type solutions and pressures to which my improved method can be applied to advantage.

While my improved method is particularly suitable for making cellulosic sheeting of various types generally including suitable solvents and plasticizers, reference may be had to "Eastman Cellulose Esters," 9th edition, 1950, published by the Tennessee Eastman Corporation, Kingsport, Tennessee (a Division of Eastman Kodak Company), for specific compositions listed therein. My method is particularly suitable for cellulose acetate film manufacture with the compositions of the following patents, although not limited thereto:

1,833,136, Sulzer, Nov. 24, 1931
1,960,185, Malm, May 22, 1934
2,006,362, Malm, July 2, 1935
2,078,261, Malm, Apr. 27, 1937
2,492,977, Fordyce et al., Jan. 3, 1950
2,492,978, Fordyce et al., Jan. 3, 1950

Typical sheetings may be prepared from partially hydrolyzed cellulose acetate dissolved in acetone or cellulose triacetate dissolved in methylene chloride and methyl alcohol as, for example, a 90%–10% solvent mixture.

A solution of 4 to 5 parts of solvent mixture of 90% ethylene chloride, 10% methyl alcohol in which is dissolved one part of a cellulose acetate propionate, as disclosed in Patent No. 2,078,261 and 0.15 part by weight of triphenyl phosphate as a plasticizer is useful for forming ribbons in accordance with my invention.

In general, solvents comprising the lower aliphatic alcohols, ketones and halogenated hydrocarbons and various mixtures thereof may be used for dissolving the cellulose esters to give film-forming compositions. Viscosities may range from 9,000 to 42,000 cps. at 80° F. Casting or deposition temperatures of the solutions of cellulose acetate may desirably be from 85° F. to 130° F. Film-forming speeds have ranged from 16 feet per minute to 100 feet per minute and it is believed that at least 166 feet per minute may be obtainable. Thus, the percentage of increase in speeds which have been actually obtained are shown in the chart to be up to 200% and it is predicted that more than 500% probably can be obtained.

The following chart indicates four different coating solutions used under different conditions, the nature of the solution, the solvent, the viscosity, the coating temperature, the coating thickness, the speed and feet per minute, the differential pressures, the percentage of speed increase with and without the differential pressures and the ratio of the pressure differences to the atmospheric pressure (since in these tests the ambient atmosphere and a degree of vacuum was employed) are shown.

| Coating Selections | Cellulose Ester | Solvent | Viscosity, Seconds | Coating Temp., °F. | Coating Thickness inches | Speed, Ft. Per Minute | Differential Pressure | Percent Speed Increase | Vacuum (Ratio of Pressure to Atmosphere) |
|---|---|---|---|---|---|---|---|---|---|
| 1 | Cellulose Triacetate | 89% Methylene Chloride, 11% Methyl Alcohol | 150 | 85 | .001 | 33 | None | | |
| 1 | do | do | 150 | 85 | .001 | 66 | 1.0"–2.0" (Actual) | 100 | 0.9974 / 0.9950 |
| 1 | do | do | 150 | 85 | .001 | 100 | 2.0"–2.5" (Actual) | 200 | 0.9950 / 0.9938 |
| 1 | do | do | 150 | 85 | .001 | 166 | 3.5"–4.0" (Predicted) | 500 | 0.9914 / 0.9901 |
| 2 | Acetate Butyrate | 89% Propylene Chloride, 11% Methyl Alcohol | 30 | 130 | .00125 | 30 | None | | |
| 2 | do | do | 30 | 130 | .00125 | 66 | 1.0"–2.0" (Actual) | 100 | 0.9974 / 0.9950 |
| 3 | Cellulose Triacetate | 85% Methylene Chloride, 10% Butyl Alcohol, 5% Methyl Alcohol | 150 | 85 | .003 | 16 | None | | |
| 3 | do | do | 150 | 85 | .003 | 33 | 2.0 (Actual) | 100 | 0.9950 |
| 4 | do | 82% Methylene Chloride, 10% Methyl Alcohol, 8% Cyclohexane | 150 | 85 | .00375 | 22 | None | | |
| 4 | do | do | 150 | 85 | .00375 | 33 | 3.5"–4.8" (Actual) | 33⅓ | 0.9914 / 0.9901 |

From this chart it will be noticed that with the first coating solution which was used to make .001 inch sheeting with old methods the sheeting could be made at 33 feet per minute. With the same solution and coating thickness and the use of differential pressures on the two sides of the flowing ribbon of coating composition a speed of 66 feet per minute or 100% increase in speed was obtained while using a differential pressure comprising room pressure on one side of the ribbon and a partial vacuum the equivalent to from 1 to 2 inches of water on the other side of the ribbon.

With the first solution and greater differential pressures including the ambient atmosphere and a partial vacuum of from 2 to 2½ inches of water, a 200% increase in speed was obtained. It is predicted further that with this same solution with 3½ to 4 inches of water pressure differential that perhaps a 500% increase may be obtainable.

With the seccond coating solution shown in the chart and a differential pressure of a vacuum the equivalent to 1 to 2 inches of water on one side of the coating ribbon and room pressure on the opposite side, the speed was stepped up from 30 to 66 feet per minute.

With a third cellulosic solution and ambient atmospheric pressure on one side of the flowing ribbon of sheet forming solution and 2 inches of water pressure differential on the other side of the ribbon, the speed was increased from 16 to 33 feet per minute.

With a fourth solution without a pressure differential, 22 feet per minute were obtained, with 3½ to 4.8 pressure differential, the speed was stepped up from 22 to 33 feet per second.

It is obvious from the above examples that an increase of speed can readily be obtained in most instances but this is only one of the advantages of my improved method. A big advantage is the reduction or complete elimination of "cross-lines" and a reduction at least to a relatively harmless extent of "slugging."

Obviously, the data given above is by way of example, and my improved method may be carried out with many solutions other than the cellulose triacetate, cellulose acetate propionate and cellulose acetate given above.

From the above specification, it will be seen that my improved method of casting sheeting accomplishes the several objects of my invention and is well adapted to meet the conditions of practical use.

As various changes may be made in my improved method set forth, it is to be understood that all the matter herein set forth or shown in the accompanying drawings is to be interpreted as illustrative only and not in a limiting sense.

Having thus described my invention, what I claim as new and desire to secure by Letters Patent of the United States is:

1. A method of forming a self-supporting unitary type sheeting which comprises forming a flowing stream of solvent-containing sheet-forming composition between an applying device and a metal casting surface movable relative thereto at a fixed distance therefrom, and positioned to receive the sheet-forming composition, said casting surface being such that the formed sheeting readily strips therefrom, and retaining the flowing stream of sheet-forming composition in a sheet-forming position against material movement with the metal casting surface by subjecting that side of the stream which will be on the casting surface to a gaseous pressure of less than a gaseous pressure on the opposite side thereof, said pressures being selected to maintain the stream steady in a sheet-forming position while drawing solvent gases over the extreme edges of the flowing stream from the higher pressure side to the lower pressure side.

2. A method of forming sheeting which comprises forming a flowing stream of solvent-containing sheet-forming composition between an applying device and a chromium casting surface movable relative thereto at a fixed distance therefrom, and positioned to receive the sheet-forming composition, said casting surface being such that the formed sheeting readily strips therefrom, and retaining the flowing stream of sheet-forming composition in a sheet-forming position against material movement with the casting surface by subjecting that side of the stream which will be on the casting surface to a gaseous pressure less than a gaseous pressure on the opposite side thereof, said pressures being selected to maintain the stream steady in a sheet-forming position, covering a portion of the deposited sheeting on the high pressure side and drawing limited quantities of solvent gases from the covered portion about the edges of the stream from the higher pressure side to the lower pressure side.

3. The process in accordance with claim 1 wherein at least a portion of a solvent from the group consisting of methylene chloride, acetone and methyl alcohol is withdrawn over the edges of the stream from the higher pressure side to the lower pressure side for preventing slugging.

References Cited in the file of this patent

UNITED STATES PATENTS

| | | |
|---|---|---|
| 2,175,125 | Mack et al. | Oct. 3, 1939 |
| 2,286,922 | Muller | June 16, 1942 |
| 2,297,504 | Salvaneschi | Sept. 29, 1942 |
| 2,301,368 | Carver | Nov. 10, 1942 |
| 2,369,484 | Nadeau | Feb. 13, 1945 |
| 2,681,294 | Beguin | June 15, 1954 |